US012196490B2

(12) United States Patent
Zhou et al.

(10) Patent No.: US 12,196,490 B2
(45) Date of Patent: Jan. 14, 2025

(54) ROTARY KILN WITH STIRRING FUNCTION

(71) Applicants: CHANGZHOU INSTITUTE OF TECHNOLOGY, Changzhou (CN); Gaoyou Huanchuang Resources Regeneration Technology Co., Ltd., Gaoyou (CN)

(72) Inventors: Pin Zhou, Gaoyou (CN); Yu Zhao, Gaoyou (CN); Jie Li, Gaoyou (CN); Changjin Zhu, Gaoyou (CN); Haiming Yang, Gaoyou (CN)

(73) Assignees: CHANGZHOU INSTITUTE OF TECHNOLOGY, Changzhou (CN); Gaoyou Huanchuang Resources Regeneration Technology Co., Ltd., Gaoyou (CN)

( * ) Notice: Subject to any disclaimer, the term of this patent is extended or adjusted under 35 U.S.C. 154(b) by 313 days.

(21) Appl. No.: 17/878,092

(22) Filed: Aug. 1, 2022

(65) Prior Publication Data

US 2023/0029864 A1 Feb. 2, 2023

(30) Foreign Application Priority Data

Jul. 30, 2021 (CN) ......................... 202110868604.8

(51) Int. Cl.
*F27B 7/18* (2006.01)
*F27D 3/00* (2006.01)
*F27B 7/22* (2006.01)

(52) U.S. Cl.
CPC .................. *F27B 7/18* (2013.01); *F27D 3/00* (2013.01); *F27B 7/22* (2013.01); *F27D 2003/0083* (2013.01)

(58) Field of Classification Search
CPC ...... F27B 7/18; F27B 7/20; F27B 7/22; F27B 7/14; F27B 7/2075; F27B 7/162;
(Continued)

(56) References Cited

U.S. PATENT DOCUMENTS 5,040,973 A * 8/1991 Matter .................... F27B 7/162 432/118
2020/0300465 A1* 9/2020 Jiang ......................... F23G 5/20

FOREIGN PATENT DOCUMENTS

CN 107218780 A * 9/2017
CN 209798481 U * 12/2019
(Continued)

*Primary Examiner* — Gregory A Wilson
(74) *Attorney, Agent, or Firm* — Bayramoglu Law Offices LLC

(57) ABSTRACT

A rotary kiln with a stirring function is provided, including a kiln head, a roller and a kiln tail. The roller is obliquely arranged on the kiln head and the kiln tail. The rotary kiln further includes a mounting shaft and stirring mechanisms. Linkage elements are arranged on an inner wall of the roller. The linkage elements are configured to drive the stirring mechanisms to perform a stirring operation. Each of the stirring mechanisms includes a rotating ring sleeve and two limiting slide bases. The rotating ring sleeve is provided with three telescopic frame bodies. A telescopic baffle is arranged in each of the three telescopic frame bodies. A secondary propulsion assembly is arranged in a mounting groove. A sealing cover is arranged at an inner end of the telescopic baffle. The telescopic frame body is communicated with the rotating ring sleeve.

8 Claims, 5 Drawing Sheets

(58) Field of Classification Search
CPC ................. F27B 2007/163; F27D 3/00; F27D 2003/0034; F27D 2003/0083; F23G 2203/208; F26B 11/02; F26B 25/16; F26B 5/08
See application file for complete search history.

(56) References Cited

FOREIGN PATENT DOCUMENTS

| | | | | | |
|---|---|---|---|---|---|
| CN | 111256465 | A | * | 6/2020 | |
| GB | 505652 | A | * | 5/1939 | |
| GB | 818320 | A | * | 8/1959 | |
| GB | 2150271 | A | * | 6/1985 | ............. F27B 7/162 |
| KR | 100448598 | B1 | * | 9/2004 | |

* cited by examiner

ROTARY KILN WITH STIRRING FUNCTION

CROSS REFERENCE TO THE RELATED APPLICATIONS

This application is based upon and claims priority to Chinese Patent Application No. 202110868604.8, filed on Jul. 30, 2021, the entire contents of which are incorporated herein by reference.

TECHNICAL FIELD

The present invention relates to the technical field of mechanical equipment, and particularly relates to a rotary kiln with a stirring function.

BACKGROUND

Rotary kilns for hazardous waste disposal originate from main thermal equipment of alumina plants, cement plants and other metallurgical and chemical plants. Since the device was introduced into China, it has gradually become the main equipment for harmless disposal of hazardous wastes, and has been widely used in the industry field. During disposal, the hazardous wastes can be continuously rolled in a roller of a rotary kiln to achieve the purpose of uniformly heating the hazardous wastes. However, the degree of rolling of the hazardous wastes in the rotary kiln is limited due to the action of gravity, in this way, the materials inside the hazardous waste stack often cannot be stirred to the outside, and thus, the hazardous wastes cannot be heated uniformly.

SUMMARY

In order to solve the technical problem that the degree of rolling of the hazardous wastes in the rotary kiln is limited due to the action of gravity, in this way, the materials inside the hazardous waste stack often cannot be stirred to the outside, and thus, the hazardous wastes cannot be heated uniformly. The present invention provides a rotary kiln with a stirring function, and stirring mechanisms are additionally provided; after rotating with a roller, a linkage element can drive a telescopic baffle extending from a telescopic frame body to move synchronously, and the telescopic baffle drives a rotating ring sleeve to rotate on a mounting shaft; in this process, the telescopic baffle and the telescopic frame body cooperate to scoop up part of the hazardous wastes in the roller, this part of the hazardous wastes will naturally scatter after reaching a high place, and the telescopic baffle can automatically retract into the telescopic frame body after reaching a high place and can extend out by self-gravity after the telescopic frame body rotates to a low place; and repeating in this way, the linkage element can indirectly push the rotating ring sleeve to rotate when rotating with the roller, so that the hazardous wastes can be continuously stirred.

The present invention provides a rotary kiln with a stirring function, including a kiln head, a roller and a kiln tail, where the roller is obliquely arranged on the kiln head and the kiln tail; the rotary kiln further includes a mounting shaft and stirring mechanisms, linkage elements are arranged on an inner wall of the roller, the linkage elements are configured to drive the stirring mechanisms to perform a stirring operation, each of the stirring mechanisms includes a rotating ring sleeve and two limiting slide bases, the rotating ring sleeve is provided with three telescopic frame bodies arranged at equal angles, a telescopic baffle in slide fit with each of the telescopic frame bodies is arranged in each of the telescopic frame bodies, the telescopic baffle can abut against and cooperate with the linkage element after extending out, a secondary propulsion assembly is arranged in a mounting groove, the secondary propulsion assembly is configured to accelerate the telescopic speed of the telescopic baffle, a detachable sealing cover is arranged at an inner end of the telescopic baffle, the sealing cover is configured to seal the mounting groove, the telescopic frame body is communicated with the rotating ring sleeve, and the two limiting slide bases are arranged on the mounting shaft at an interval; and a pop-up assembly configured to prevent the telescopic baffle from being stuck is arranged on a lower right side wall of the mounting shaft, the mounting shaft is mounted on the kiln head and the kiln tail, the mounting shaft is coaxial with the roller, the stirring mechanisms are rotatably arranged on the mounting shaft, and the stirring mechanisms are located between the two limiting slide bases. The stirring mechanisms are additionally provided; after the roller rotates, the linkage element is driven to rotate synchronously, until the linkage element is in contact with the telescopic baffle extending from the telescopic frame body, the linkage element can drive the telescopic baffle to move synchronously, and the telescopic baffle drives the rotating ring sleeve to rotate on the mounting shaft; and in this process, the telescopic baffle and the telescopic frame body cooperate to scoop up part of the hazardous wastes in the roller, this part of the hazardous wastes will naturally scatter after reaching a high place, the telescopic baffle can automatically retract into the telescopic frame body after reaching a high place and can extend out by self-gravity after the telescopic frame body rotates to a low place, and the linkage element can indirectly push the rotating ring sleeve to rotate when rotating with the roller, so that the hazardous wastes can be continuously stirred.

Preferably, a plurality of stirring mechanisms are provided, and all stirring mechanisms are rotatably arranged on the mounting shaft at equal intervals in a direction from the kiln tail to the kiln head.

Preferably, the secondary propulsion assembly includes two guide rods and a propulsion block, a threaded hole is formed in a top of each of the guide rods, a bolt matched with the threaded hole is arranged in the threaded hole, the propulsion block is provided with two guide chutes in guide fit with the guide rods, the two guide rods are symmetrically arranged in the mounting groove, the propulsion block is slidably arranged on the two guide rods through the two guide chutes, and the sealing cover is provided with two counter bores matched with the bolts.

Preferably, an inclined surface is arranged at an outer end of the telescopic baffle.

Preferably, a plurality of scraping strips arranged at equal intervals are also arranged at the outer end of the telescopic baffle.

Preferably, two linkage elements are provided, the two linkage elements are arranged on the inner wall of the roller at equal angles, and each of the linkage elements is provided with a wedge surface matched with the inclined surface.

Preferably, the linkage element is Z-shaped.

Preferably, the pop-up assembly includes a pop-up housing and a plurality of return springs, an opening is formed in one end of the pop-up housing, limiting blocks are arranged on both sides of the opening, an arc surface is arranged at the other end of the pop-up housing, a built-in groove matched with the pop-up housing is formed on the lower right side wall of the mounting shaft, detachable stop blocks configured to stop the limiting blocks are arranged on both sides of the built-in groove, the pop-up housing and all return springs are arranged in the built-in groove, the pop-up housing is sleeved on all return springs, and one end of each of the return springs is in contact with an inner side wall of the pop-up housing.

The present invention has the following beneficial effects:

In the rotary kiln with a stirring function of the present invention, the stirring mechanisms are additionally provided; after rotating with the roller, the linkage element can drive the telescopic baffle extending from the telescopic frame body to move synchronously, and the telescopic baffle drives the rotating ring sleeve to rotate on the mounting shaft; in this process, the telescopic baffle and the telescopic frame body cooperate to scoop up part of the hazardous wastes in the roller, this part of the hazardous wastes will naturally scatter after reaching a high place, and the telescopic baffle can automatically retract into the telescopic frame body after reaching a high place and can extend out by self-gravity after the telescopic frame body rotates to a low place; and in this way, the linkage element can indirectly push the rotating ring sleeve to rotate when rotating with the roller, so that the hazardous wastes can be continuously stirred.

In the rotary kiln with a stirring function of the present invention, the secondary propulsion assembly is provided; when the telescopic baffle gradually rotates to a low place or a high place around an axis of the rotating ring sleeve, the propulsion block will also move on the two guide rods due to self-gravity; and the propulsion block can perform an impact after moving, and the impact force can be transferred to the telescopic baffle, so that the extension or retraction speed of the telescopic baffle is accelerated.

In the rotary kiln with a stirring function of the present invention, the pop-up assembly is provided; when the telescopic baffle rotates to a lower right position around the mounting shaft, if the telescopic baffle can not perform an action of extending out due to gravity because of excessive sticking, the pop-up housing can be quickly ejected from the built-in groove through the elasticity of the return springs; and the pop-up housing can perform an impact on the inner end of the stuck telescopic baffle, and the impact enables the telescopic baffle to extend out from the telescopic frame body.

In the rotary kiln with a stirring function of the present invention, two linkage elements are provided, and the two linkage elements can reduce the down time of the rotating ring sleeve, so that the stirring efficiency is higher.

In the rotary kiln with a stirring function of the present invention, the inclined surface is matched with the wedge surface to provide additional power for the telescopic baffle when retracting into the telescopic frame body, so that the telescopic baffle can retract more quickly.

In the rotary kiln with a stirring function of the present invention, the scraping strips can be configured to scrape off the hazardous wastes adhering to an inner bottom wall of the roller.

BRIEF DESCRIPTION OF THE DRAWINGS

In order to more clearly illustrate the technical solutions in specific implementations of the present invention or in the prior art, the accompanying drawings required for description in the specific implementations or the prior art will be briefly described below. Apparently, the accompanying drawings in the following description show some implementations of the present invention, and those of ordinary skill in the art may still derive other accompanying drawings according to these accompanying drawings without creative efforts.

Figure 1:
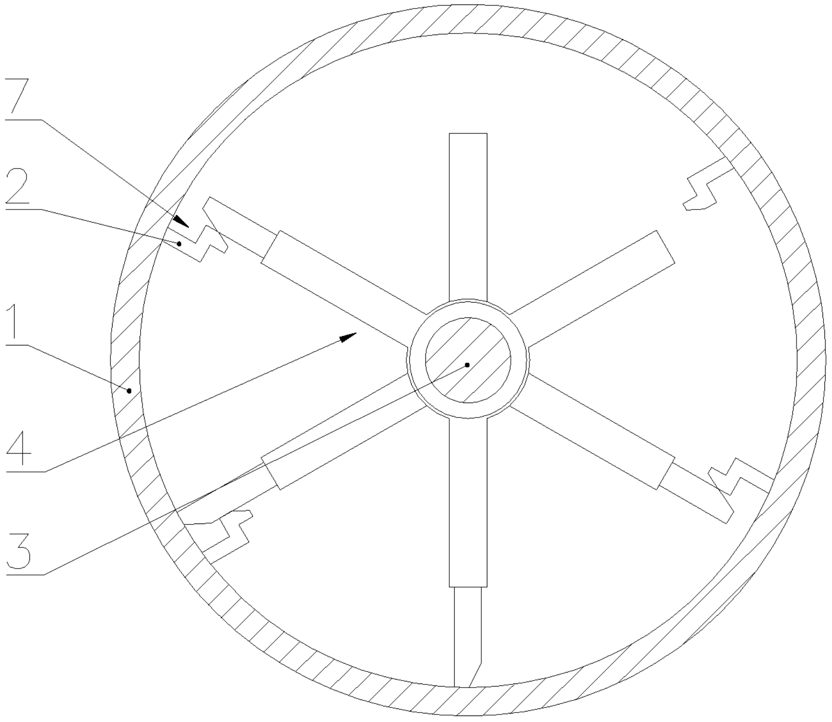
FIG. 1 is a cross-sectional structural view of a roller of the present invention.
Figure 2:
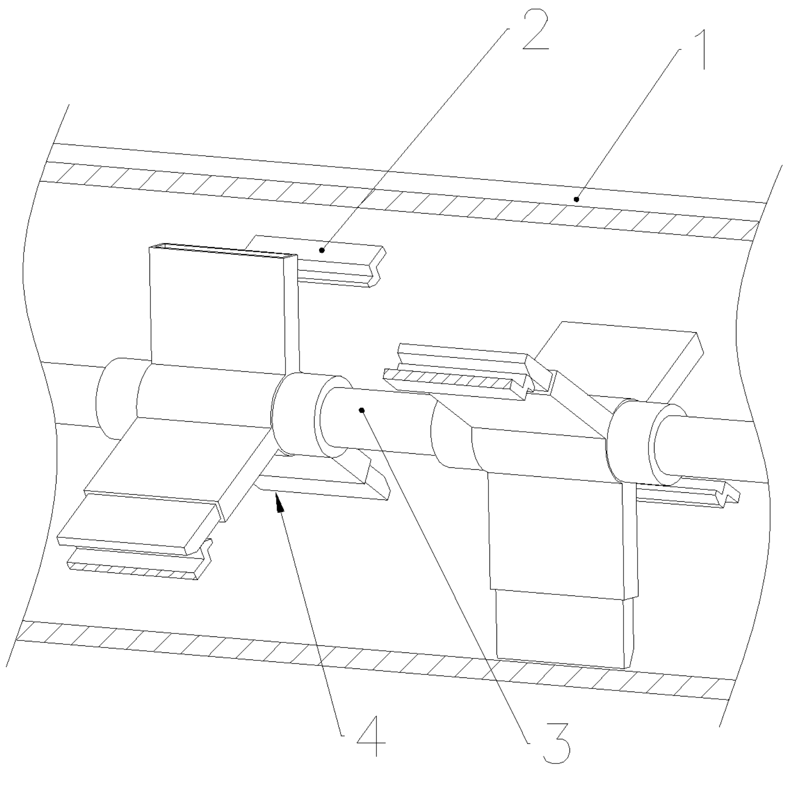
FIG. 2 is a partial cross-sectional view I of the present invention.
Figure 3:
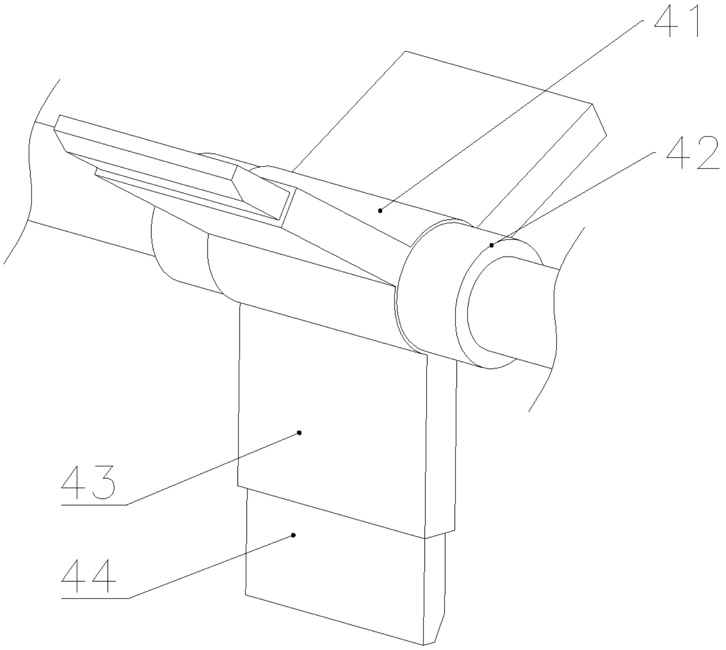
FIG. 3 is a schematic structural view I of a stirring structure.
Figure 4:
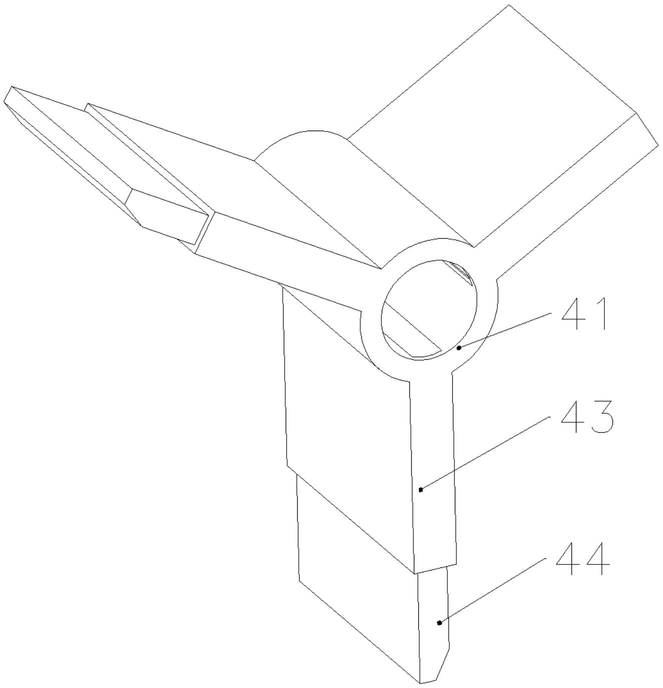
FIG. 4 is a schematic structural view II of the stirring structure.
Figure 5:
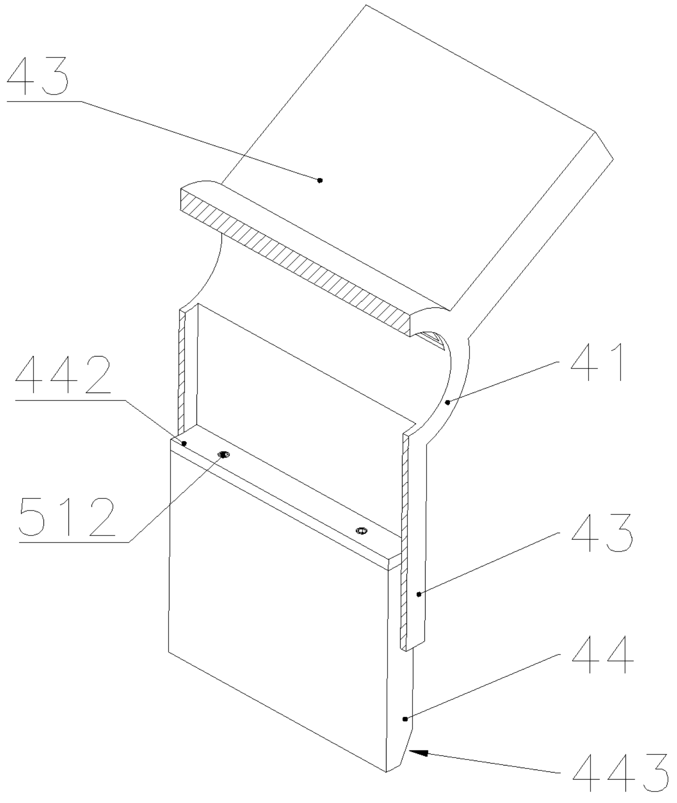
FIG. 5 is a partial cross-sectional view of the stirring structure.
Figure 6:
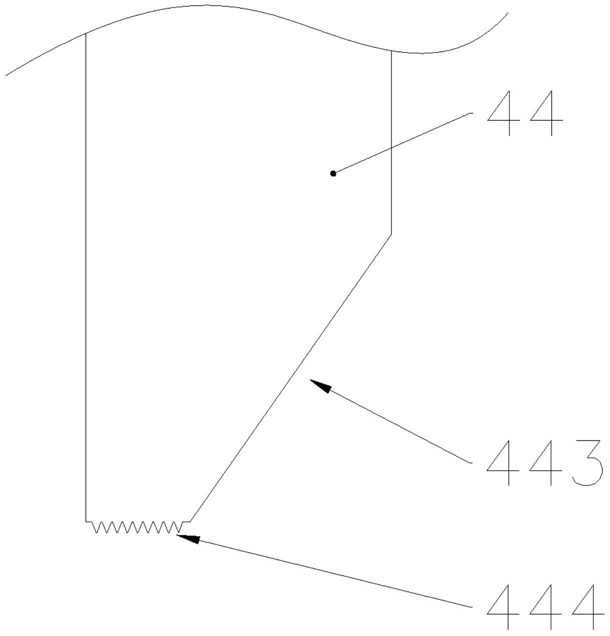
FIG. 6 is a partial schematic view of a telescopic baffle.
Figure 7:
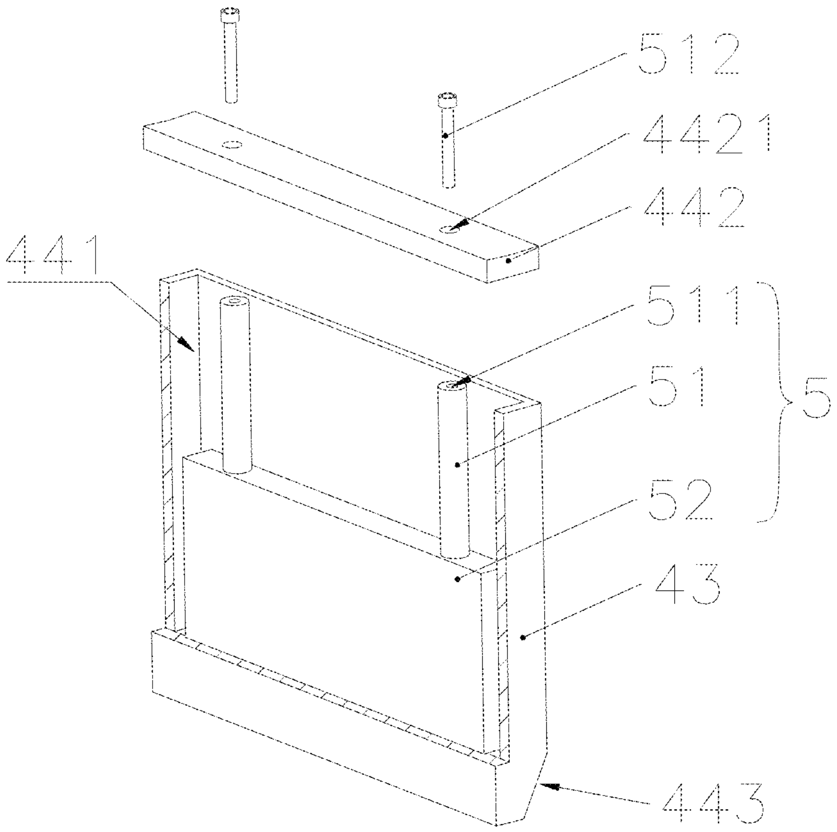
FIG. 7 is a partial cross-sectional view of the telescopic baffle.
Figure 8:
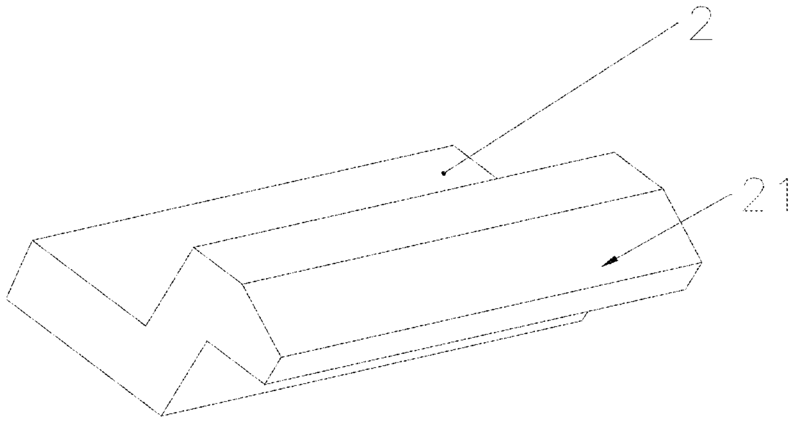
FIG. 8 is a schematic structural view of a linkage element.

Reference Numerals: roller 1, linkage element 2, wedge surface 21, mounting shaft 3, built-in groove 31, stop block 311, stirring mechanism 4, rotating ring sleeve 41, limiting slide base 42, telescopic frame body 43, telescopic baffle 44, mounting groove 441, sealing cover 442, counter bore 4421, inclined surface 443, scraping strip 444, secondary propulsion assembly 5, guide rod 51, threaded hole 511, bolt 512, propulsion block 52, pop-up assembly 6, pop-up housing 61, opening 611, limiting block 612, arc surface 613, return spring 62, containing groove 7.

DETAILED DESCRIPTION OF THE EMBODIMENTS

The technical solutions of the present invention will be clearly and completely described below with reference to the accompanying drawings. Apparently, the described embodiments are merely a part rather than all of the embodiments of the present invention.

FIG. 1 to FIG. 10 show a rotary kiln with a stirring function, including: a kiln head, a roller 1 and a kiln tail. The roller 1 is obliquely arranged on the kiln head and the kiln tail. The rotary kiln further includes a mounting shaft 3 and stirring mechanisms 4. Linkage elements 2 are arranged on an inner wall of the roller 1, and the linkage elements 2 are configured to drive the stirring mechanisms 4 to perform a stirring operation. Each of the stirring mechanisms 4 includes a rotating ring sleeve 41 and two limiting slide bases 42, the rotating ring sleeve 41 is provided with three telescopic frame bodies 43 arranged at equal angles, a telescopic baffle 44 in slide fit with each of the telescopic frame bodies 43 is arranged in each of the telescopic frame bodies 43, the telescopic baffle 44 can abut against and cooperate with the linkage element 2 after extending out, a mounting groove 441 is formed in the telescopic baffle 44, a secondary propulsion assembly 5 is arranged in the mounting groove 441, the secondary propulsion assembly 5 is configured to accelerate the telescopic speed of the telescopic baffle 44, a detachable sealing cover 442 is arranged at an inner end of the telescopic baffle 44, the sealing cover 442 is configured to seal the mounting groove 441, the telescopic frame body 43 is communicated with the rotating ring sleeve 41, and the two limiting slide bases 42 are arranged on the mounting shaft 3 at an interval; and a pop-up assembly 6 configured to prevent the telescopic baffle 44 from being stuck is arranged on a lower right side wall of the mounting shaft 3, the mounting shaft 3 is mounted on the kiln head and the kiln tail, the mounting shaft 3 is coaxial with the roller 1, the stirring mechanisms 4 are rotatably arranged on the mounting shaft 3, and the stirring mechanisms 4 are located between the two limiting slide bases 42. After the roller 1 rotates, the linkage element 2 is driven to rotate synchronously, until the linkage element 2 is in contact with the telescopic baffle 44 extending from the telescopic frame body 43, then the linkage element 2 can drive the entire rotating ring sleeve 41 to synchronously rotate together, the telescopic baffle 44 and the telescopic frame body 43 cooperate to scoop up part of the hazardous wastes in the roller 1, this part of the hazardous wastes will naturally scatter after reaching a high place, the telescopic baffle 44 gradually retracts into the telescopic frame body 43 due to the action of gravity after reaching a high place, and then, the linkage element 2 is separated from the telescopic baffle 44; when the linkage element 2 is in contact with the next extended telescopic baffle 44, the entire rotating ring sleeve 41 can be driven to rotate by a certain angle; during rotation, part of the hazardous wastes is scooped up and stirred, and the retraction and extension speed of the telescopic baffle 44 can be accelerated through the secondary propulsion assembly 5; during extension, an additional impact force can also be provided, so that the telescopic baffle 44 can be better inserted into the hazardous wastes and is in contact with the inner wall of the roller 1; and when the telescopic baffle 44 rotates to a lower right position around the mounting shaft 3, if the telescopic baffle 44 can not perform an action of extending out due to gravity because of excessive sticking, the pop-up assembly 6 can provide an ejection force for the telescopic baffle 44, so that the telescopic baffle 44 can perform the action of extending out.

In a specific implementation, a plurality of stirring mechanisms 4 are provided, and all stirring mechanisms 4 are rotatably arranged on the mounting shaft 3 at equal intervals in a direction from the kiln tail to the kiln head. An appropriate number of stirring mechanisms 4 are selected according to the length of the roller 1.

Preferably, the hazardous wastes are all stacked at the rear section of the roller 1, so that the stirring mechanisms 4 are arranged at the rear section of the roller 1, and then, the stirring effect is better.

In a specific implementation, the secondary propulsion assembly 5 includes two guide rods 51 and a propulsion block 52, a threaded hole 511 is formed in a top of each of the guide rods 51, a bolt 512 matched with the threaded hole 511 is arranged in the threaded hole 511, the propulsion block 52 is provided with two guide chutes in guide fit with the guide rods 51, the two guide rods 51 are symmetrically arranged in the mounting groove 441, the propulsion block 52 is slidably arranged on the two guide rods 51 through the two guide chutes, and the sealing cover 442 is provided with two counter bores 4421 matched with the bolts 512. When the telescopic baffle 44 gradually rotates to a low place around an axis of the rotating ring sleeve 41, the propulsion block 52 will also move on the two guide rods 51 due to self-gravity, the propulsion block 52 can impact a groove wall of the mounting groove 441 of the telescopic baffle 44 after moving, and the impact force can be transferred to the telescopic baffle 44, so that the extension speed of the telescopic baffle 44 is accelerated. In a similar way, the retraction speed of the telescopic baffle 44 can be accelerated.

In a specific implementation, an inclined surface 443 is arranged at an outer end of the telescopic baffle 44. In this way, the outer end of the telescopic baffle 44 forms a pointed end, so that the telescopic baffle 44 can be conveniently inserted into the hazardous wastes.

In a specific implementation, a plurality of scraping strips 444 arranged at equal intervals are also arranged at the outer end of the telescopic baffle 44. The scraping strips 444 can be configured to scrape off the hazardous wastes adhering to an inner bottom wall of the roller 1.

In a specific implementation, two linkage elements 2 are provided, the two linkage elements 2 are arranged on the inner wall of the roller 1 at equal angles, and each of the linkage elements 2 is provided with a wedge surface 21 matched with the inclined surface 443. The two linkage elements 2 can reduce the down time of the rotating ring sleeve 41, so that the stirring efficiency is higher. The inclined surface 443 is matched with the wedge surface 21 to provide additional power for the telescopic baffle 44 when retracting into the telescopic frame body 43, so that the telescopic baffle 44 can retract more quickly.

Figure 9:
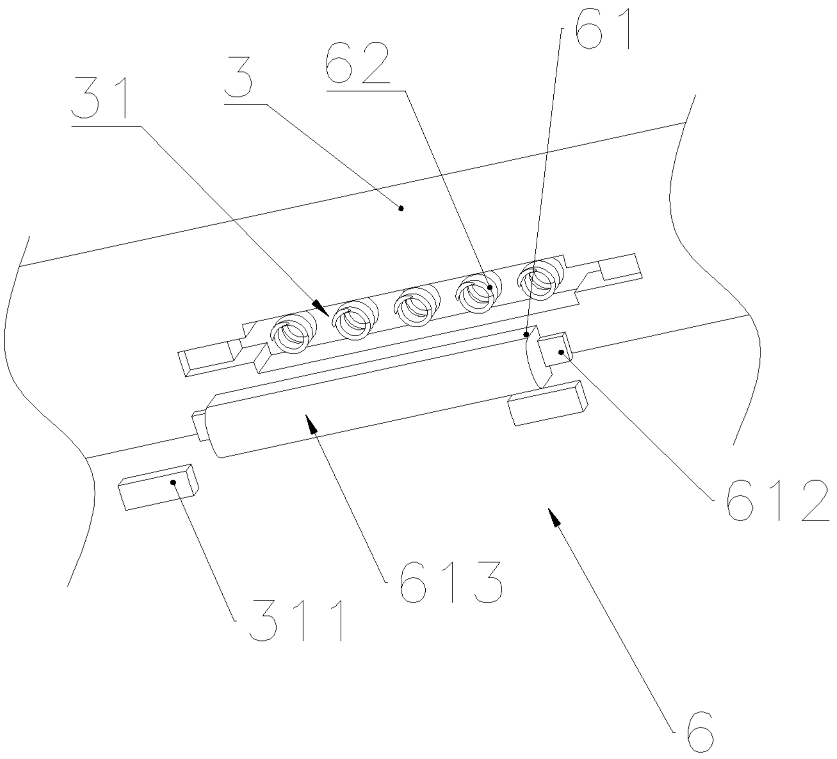
FIG. 9 is a schematic exploded view of a pop-up assembly.
Figure 10:
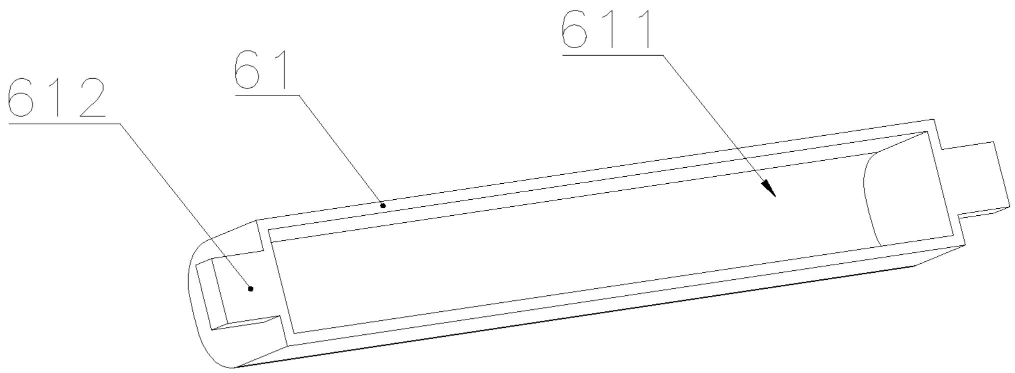
FIG. 10 is a schematic structural view of a pop-up housing.

In a specific implementation, the linkage element 2 is Z-shaped. As shown in FIG. 1 and FIG. 9, the Z-shaped linkage element 2 and the inner wall of the roller 1 can form a containing groove 7, and the containing groove 7 can also carry part of the hazardous wastes to rotate with the roller 1 to realize a stirring operation, thereby improving the stirring effect.

In a specific implementation, the pop-up assembly 6 includes a pop-up housing 61 and a plurality of return springs 62, an opening 611 is formed in one end of the pop-up housing 61, limiting blocks 612 are arranged on both sides of the opening 611, an arc surface 613 is arranged at the other end of the pop-up housing 61, a built-in groove 31 matched with the pop-up housing 61 is formed on the lower right side wall of the mounting shaft 3, detachable stop blocks 311 configured to stop the limiting blocks 612 are arranged on both sides of the built-in groove 31, the pop-up housing 61 and all return springs 62 are arranged in the built-in groove 31, the pop-up housing 61 is sleeved on all return springs 62, and one end of each of the return springs 62 is in contact with an inner side wall of the pop-up housing 61. When the telescopic frame body 43 gradually rotates to the pop-up housing 61, the pop-up housing 61 can be quickly ejected from the built-in groove 31 through the elasticity of the return springs 62, the pop-up housing 61 can perform an impact on the inner end of the stuck telescopic baffle 44, and the impact enables the telescopic baffle 44 to extend out from the telescopic frame body 43. The deflection of the movement of the pop-up housing 61 can be avoided through the limiting block 612, the pop-up distance of the pop-up housing 61 can be limited through the stop block 311, then the rotating ring sleeve 41 continues to rotate, the pop-up housing 61 can retract into the built-in groove 31 through the contact of the arc surface 613 of the pop-up housing 61, and the return spring 62 returns to a compressed state.

Finally, it should be noted that the above embodiments are only used to illustrate the technical solutions of the present invention, but not to limit the present invention. Although the present invention has been described in detail with reference to the foregoing embodiments, those of ordinary skill in the art should understand that: they can still modify the technical solutions described in the foregoing embodiments, or perform equivalent replacements to some or all of the technical features. However, the essence of the corresponding technical solutions does not depart from the scope of the technical solutions of the embodiments of the present invention due to these modifications or replacements.

What is claimed is:

1. A rotary kiln with a stirring function, comprising:

a kiln head, a roller, a kiln tail, a mounting shaft, and stirring mechanisms, wherein the roller is obliquely arranged on the kiln head and the kiln tail;

linkage elements are arranged on an inner wall of the roller, and the linkage elements are configured to drive the stirring mechanisms to perform a stirring operation;

each of the stirring mechanisms comprises a rotating ring sleeve and two limiting slide bases, the rotating ring sleeve is provided with three telescopic frame bodies arranged at equal angles, a telescopic baffle in a slide fit with each of the three telescopic frame bodies is arranged in each of the three telescopic frame bodies, the telescopic baffle abuts against and cooperates with a linkage element of the linkage elements after extending out, a mounting groove is formed in the telescopic baffle, a secondary propulsion assembly is arranged in the mounting groove, the secondary propulsion assembly is configured to accelerate a telescopic speed of the telescopic baffle, a detachable sealing cover is arranged at an inner end of the telescopic baffle, the detachable sealing cover is configured to seal the mounting groove, each of the three telescopic frame bodies is communicated with the rotating ring sleeve, and the two limiting slide bases are arranged on the mounting shaft at an interval; and a pop-up assembly configured to prevent the telescopic baffle from being stuck is arranged on a lower right side wall of the mounting shaft, the mounting shaft is mounted on the kiln head and the kiln tail, the mounting shaft is coaxial with the roller, the stirring mechanisms are rotatably arranged on the mounting shaft, and the stirring mechanisms are located between the two limiting slide bases.

2. The rotary kiln according to claim 1, wherein the stirring mechanisms are rotatably arranged on the mounting shaft at equal intervals in a direction from the kiln tail to the kiln head.

3. The rotary kiln according to claim 1, wherein the secondary propulsion assembly comprises two guide rods and a propulsion block, a threaded hole is formed in a top of each of the two guide rods, a first bolt matched with the threaded hole is arranged in the threaded hole, the propulsion block is provided with two guide chutes in a guide fit with the two guide rods, the two guide rods are symmetrically arranged in the mounting groove, the propulsion block is slidably arranged on the two guide rods through the two guide chutes, and the detachable sealing cover is provided with two counter bores matched with second bolts.

4. The rotary kiln according to claim 1, wherein an inclined surface is arranged at an outer end of the telescopic baffle.

5. The rotary kiln according to claim 4, wherein a plurality of scraping strips arranged at equal intervals are also arranged at the outer end of the telescopic baffle.

6. The rotary kiln according to claim 4, comprising two linkage elements, wherein the two linkage elements are arranged on the inner wall of the roller at equal angles, and each of the two linkage elements is provided with a wedge surface matched with the inclined surface.

7. The rotary kiln with according to claim 6, wherein each of the two linkage elements is Z-shaped.

8. The rotary kiln according to claim 1, wherein the pop-up assembly comprises a pop-up housing and a plurality of return springs, an opening is formed in a first end of the pop-up housing, limiting blocks are arranged on two sides of the opening, an arc surface is arranged at a second end of the pop-up housing, a built-in groove matched with the pop-up housing is formed on the lower right side wall of the mounting shaft, detachable stop blocks configured to stop the limiting blocks are arranged on two sides of the built-in groove, the pop-up housing and the plurality of return springs are arranged in the built-in groove, the pop-up housing is sleeved on the plurality of return springs, and an end of each of the plurality of return springs is in contact with an inner side wall of the pop-up housing.

* * * * *